United States Patent
Lee et al.

(10) Patent No.: US 9,141,545 B2
(45) Date of Patent: *Sep. 22, 2015

(54) SPECULATIVE READ IN A CACHE COHERENT MICROPROCESSOR

(71) Applicant: ARM Finance Overseas Limited, Cambridge (GB)

(72) Inventors: William Lee, Portland, OR (US); Thomas Benjamin Berg, Portland, OR (US)

(73) Assignee: ARM Finance Overseas Limited, Cambridge (GB)

(*) Notice: Subject to any disclaimer, the term of this patent is extended or adjusted under 35 U.S.C. 154(b) by 0 days.

This patent is subject to a terminal disclaimer.

(21) Appl. No.: 14/557,715

(22) Filed: Dec. 2, 2014

(65) Prior Publication Data

US 2015/0089157 A1    Mar. 26, 2015

Related U.S. Application Data (63) Continuation of application No. 14/180,053, filed on Feb. 13, 2014, now Pat. No. 8,930,634, which is a continuation of application No. 11/864,363, filed on Sep. 28, 2007, now abandoned.

(51) Int. Cl.
G06F 12/08    (2006.01)

(52) U.S. Cl.
CPC ........ *G06F 12/0828* (2013.01); *G06F 12/0815* (2013.01); *G06F 12/0831* (2013.01);
(Continued)

(58) Field of Classification Search
CPC ............ G06F 12/0831; G06F 12/0871; G06F 12/0815; G06F 12/0828

USPC .......... 711/141, 170, 203, 207, 202, E12.008
See application file for complete search history.

(56) References Cited

U.S. PATENT DOCUMENTS

| | | | |
|---|---|---|---|
| 5,406,504 A | 4/1995 | Denisco et al. | |
| 5,530,933 A | 6/1996 | Frink et al. | |

(Continued)

FOREIGN PATENT DOCUMENTS

| WO | WO 95/30954 A1 | 11/1995 |
|---|---|---|
| WO | WO 2007/096572 A1 | 8/2007 |

OTHER PUBLICATIONS

Application and File history for U.S. Appl. No. 14/180,053, filed Feb. 13, 2014. Inventors: Lee et al.

(Continued)

*Primary Examiner* — Pierre-Michel Bataille
(74) *Attorney, Agent, or Firm* — Patterson Thuente Pedersen, P.A.

(57) ABSTRACT

A cache coherence manager, disposed in a multi-core microprocessor, includes a request unit, an intervention unit, a response unit and an interface unit. The request unit receives coherent requests and selectively issues speculative requests in response. The interface unit selectively forwards the speculative requests to a memory. The interface unit includes at least three tables. Each entry in the first table represents an index to the second table. Each entry in the second table represents an index to the third table. The entry in the first table is allocated when a response to an associated intervention message is stored in the first table but before the speculative request is received by the interface unit. The entry in the second table is allocated when the speculative request is stored in the interface unit. The entry in the third table is allocated when the speculative request is issued to the memory.

13 Claims, 8 Drawing Sheets

(52) U.S. Cl.
CPC ...... *G06F12/0871* (2013.01); *G06F 2212/507* (2013.01); *G06F 2212/621* (2013.01); *Y02B 60/1225* (2013.01)

(56) References Cited

U.S. PATENT DOCUMENTS

| | | | |
|---|---|---|---|
| 5,551,005 | A | 8/1996 | Sarangdhar et al. |
| 5,715,428 | A | 2/1998 | Wang et al. |
| 5,889,779 | A | 3/1999 | Lincoln |
| 6,073,217 | A | 6/2000 | Mahalingalah et al. |
| 6,088,771 | A | 7/2000 | Steely, Jr. et al. |
| 6,202,127 | B1 | 3/2001 | Dean et al. |
| 6,216,200 | B1 | 4/2001 | Yeager |
| 6,266,755 | B1 | 7/2001 | Yeager |
| 6,393,500 | B1 | 5/2002 | Thekkath |
| 6,418,517 | B1 | 7/2002 | McKenney et al. |
| 6,490,642 | B1 | 12/2002 | Thekkath et al. |
| 6,493,776 | B1 | 12/2002 | Courtright et al. |
| 6,507,862 | B1 | 1/2003 | Joy et al. |
| 6,594,728 | B1 | 7/2003 | Yeager |
| 6,604,159 | B1 | 8/2003 | Thekkath et al. |
| 6,651,156 | B1 | 11/2003 | Courtright et al. |
| 6,681,283 | B1 | 1/2004 | Thekkath et al. |
| 6,721,813 | B2 | 4/2004 | Owen et al. |
| 6,732,208 | B1 | 5/2004 | Alsaadi et al. |
| 6,976,155 | B2 | 12/2005 | Drysdale et al. |
| 7,003,630 | B1 | 2/2006 | Kissell |
| 7,017,025 | B1 | 3/2006 | Kissell |
| 7,047,372 | B2 | 5/2006 | Zeitler et al. |
| 7,099,913 | B1 | 8/2006 | Bertone et al. |
| 7,107,567 | B1 | 9/2006 | LeBlanc |
| 7,162,590 | B2 | 1/2007 | Pruvost et al. |
| 7,162,615 | B1 | 1/2007 | Gelinas et al. |
| 7,240,165 | B2 | 7/2007 | Tierney et al. |
| 7,257,814 | B1 | 8/2007 | Melvin et al. |
| 7,353,340 | B2 | 4/2008 | Hetherington et al. |
| 7,398,360 | B2 * | 7/2008 | Hetherington et al. ....... 711/141 |
| 7,529,893 | B2 * | 5/2009 | Landin et al. ................. 711/141 |
| 7,536,513 | B2 * | 5/2009 | Guthrie et al. ................ 711/141 |
| 7,577,822 | B2 | 8/2009 | Vorbach |
| 7,600,078 | B1 * | 10/2009 | Cen et al. ...................... 711/137 |
| 7,644,237 | B1 | 1/2010 | Petersen et al. |
| 7,739,476 | B2 | 6/2010 | Pan et al. |
| 7,769,958 | B2 * | 8/2010 | Kinter et al. .................. 711/141 |
| 8,615,013 | B2 | 12/2013 | Sonnier et al. |
| 2001/0005873 | A1 | 6/2001 | Yasuda et al. |
| 2002/0129029 | A1 | 9/2002 | Warner et al. |
| 2002/0133674 | A1 | 9/2002 | Martin et al. |
| 2004/0019891 | A1 | 1/2004 | Koenen |
| 2004/0249880 | A1 | 12/2004 | Vorbach |
| 2005/0053057 | A1 | 3/2005 | Deneroff et al. |
| 2005/0071722 | A1 | 3/2005 | Biles |
| 2006/0179429 | A1 | 8/2006 | Eggers et al. |
| 2006/0282645 | A1 | 12/2006 | Tsien |
| 2007/0043911 | A1 | 2/2007 | Hetherington et al. |
| 2007/0043913 | A1 | 2/2007 | Hetherington et al. |
| 2007/0113053 | A1 | 5/2007 | Jensen et al. |
| 2008/0215815 | A1 | 9/2008 | Dombrowski et al. |
| 2009/0019232 | A1 | 1/2009 | Deshpande et al. |
| 2009/0083493 | A1 | 3/2009 | Kinter |
| 2009/0089510 | A1 | 4/2009 | Lee et al. |
| 2009/0157981 | A1 | 6/2009 | Kinter et al. |
| 2009/0248988 | A1 | 10/2009 | Berg et al. |
| 2009/0276578 | A1 | 11/2009 | Moyer |
| 2010/0235579 | A1 | 9/2010 | Biles et al. |
| 2010/0287342 | A1 | 11/2010 | Greenberg et al. |
| 2010/0332787 | A1 | 12/2010 | Grohoski et al. |
| 2014/0164714 | A1 | 6/2014 | Lee et al. |

OTHER PUBLICATIONS

Application and File history for U.S. Appl. No. 11/864,363, filed Sep. 28, 2007. Inventors: Lee et al.
Non-Final Office Action mailed May 16, 2012, for U.S. Appl. No. 12/332,291, 33 pages.
Office Action for Chinese Patent Application No. 200880108013.3 mailed Mar. 14, 2012, 7 pages.
Non-Final Office Action mailed Jan. 22, 2010 for U.S. Appl. No. 11/859,198, 9 pages.
Non-Final Office Action Oct. 6, 2010 for U.S. Appl. No. 11/859,198, 11 pages.
Final Office Action mailed Jun. 21, 2011 for U.S. Appl. No. 11/859,198, 10 pages.
Notice of Allowance mailed Oct. 26, 2011 for U.S. Appl. No. 11/859,198, 7 pages.
International Search Report and Written Opinion dated Dec. 15, 2008 for PCT Application No. PCT/US2008/077084, 9 pages.
Non-Final Office Action mailed Mar. 31, 2011 for U.S. Appl. No. 12/332,291, 19 pages.
Final Office Action mailed Nov. 19, 2011 for U.S. Appl. No. 12/332,291, 22 pages.
"CPU cache," from Wikipedia, retrieved from the Internet on Nov. 10, 2007 at http://en.wikipedia.org/wiki/CPU_cache, pp. 1-16.
"Self-modifying code," from Wikipedia, retrieved from the Internet on Nov. 10, 2007 at http://en.wikipedia.org/wiki/Self-modifying_code, pp.1-5.
Drepper, Ulrich, "Memory part 2: CPU caches," retrieved from the Internet on Nov. 10, 2007 at http://lwn.net/Articles_252125/, pp. 1-53.
Genua, P., "A cache primer," Freescale Semiconductor AN2663, Rev. 1, Oct. 2004, pp. 1-16.
McKenney, Paul E., "Memory ordering in modern microprocessors, Part II," created Jul. 28, 2005, retrieved from the Internet on Jan. 3, 2008 at http://linuxjournal.com/print/8212, pp. 1-8.
MIPS32® Processor Core Family Software User's Manual, MIPS Technologies, Document No. MD00534, Revision 01.02, Dec. 19, 2006, 375 pages.
Non-Final Office Action mailed Sep. 2, 2010 for U.S. Appl. No. 12/058,117, 25 pages.
Non-Final Office Action mailed May 10, 2011 for U.S. Appl. No. 12/058,117, 8 pages.
International Search Report and Written Opinion mailed Jul. 1, 2009 for PCT Application No. PCT/US2009/038261, 12 pages.

\* cited by examiner

000
SPECULATIVE READ IN A CACHE COHERENT MICROPROCESSOR

RELATED APPLICATIONS

This application is a continuation of application Ser. No. 14/180,053 filed Feb. 13, 2014, which in turn is a continuation of application Ser. No. 11/864,363 filed Sep. 28, 2007, now abandoned, each of which is hereby fully incorporated herein by reference.

BACKGROUND OF THE INVENTION

The present invention relates to multiprocessor systems, and more particularly to performing a speculative request in a cache coherent multi-core microprocessor system.

Advances in semiconductor fabrication technology have given rise to considerable increases in microprocessor clock speeds. Although the same advances have also resulted in improvements in memory density and access times, the disparity between microprocessor clock speeds and memory access times continues to persist. To reduce latency, often one or more levels of high-speed cache memory are used to hold a subset of the data or instructions that are stored in the main memory. A number of techniques have been developed to increase the likelihood that the data/instructions held in the cache are repeatedly used by the microprocessor.

To improve performance at any given operating frequency, microprocessors with a multitude of cores that execute instructions in parallel have been developed. The cores may be integrated within the same semiconductor die, or may be formed on different semiconductor dies coupled to one another within a package, or a combination of the two. Each core typically includes its own level-1 cache and an optional level-2 cache.

In order to reduce the average latency associated with a coherent read request, a technique commonly referred to as speculative read may be used. In accordance with this technique, concurrently with searching for the requested data in the caches, a speculative read request is also issued to the memory. If the requested data is stored in any of the caches, the speculative read is cancelled. If the requested data is not stored in any of the caches, the speculative read is confirmed and the data identified by the confirmed request is transferred from the memory to the requesting core.

BRIEF SUMMARY OF THE INVENTION

In accordance with one embodiment of the present invention, a multi-core microprocessor includes, in part, a cache coherence manager that maintains cache coherence among the multitude of cores and also minimizes latency associated with performing coherent requests. The cache coherence manager includes, in part, a request unit, an intervention unit, a response unit, and a memory interface unit. The request unit is configured to selectively issue a speculative request in response to a coherent request received from one of the cores. The intervention unit is configured to send an intervention message associated with the coherent request to the cores. The memory interface unit is configured to receive the speculative request and to selectively cancel or forward the speculative request to a memory.

In one embodiment, the memory interface unit includes at least three tables. An entry in the first table is an index to the second table. The entry in the second table is an index to the third table. The entry in the first table is allocated when a response to the intervention message is stored in the first table before the speculative request is stored in the memory interface unit. The entry in the second table is allocated when the request is stored in the memory interface unit. The entry in the third table is allocated when the speculative request is issued to the memory.

In one embodiment, the request unit includes, in part, a fourth table storing a multitude of addresses, and a logic block configured to compare an address associated with the request to the multitude of addresses stored in the fourth table. Each address stored in the fourth table is associated with a pending coherent request. If an address match is not detected, the logic block issues the speculative request and assigns an identifier thereto. The identifier is used as an index to the first entry in the first table. In another embodiment, the logic block issues the speculative request first, assigns a corresponding identifier, and subsequently compares the requested address to the addresses stored in the fourth table. If an address match is detected, the logic block cancels the speculative request. In one embodiment, the request unit does not issue a speculative request unless the number of unresolved speculative requests is less than the total number of entries of the third table.

In accordance with one embodiment of the present invention, a method of operating a multi-core microprocessor having disposed therein a cache coherence manager includes, in part, receiving a coherent request from one of the cores, selectively issuing a speculative request in response, sending an intervention message associated with the coherent request to the cores, and selectively sending the issued speculative request to a memory.

In one embodiment, the memory interface unit includes at least three tables. An entry in the first table is an index to the second table. The entry in the second table is an index to the third table. The entry in the first table is allocated when a response to the intervention message arrives at the first table before the corresponding request is stored the memory interface unit. The entry in the second table is allocated when the speculative request is stored in the memory interface unit. The entry in the third table is allocated when the speculative request is issued to the memory.

In one embodiment, the address associated with the coherent request is compared to a multitude of addresses stored in a fourth table. Each address stored in the fourth table is associated with a pending coherent request. If an address match is not detected, the request is speculatively issued and an identifier is assigned to this request. The identifier is used as an index to the first entry in the first table. In another embodiment, the speculative request is first issued and a corresponding identifier is assigned. If a match is thereafter detected between the address associated with the request and any one of the addresses stored in the fourth table, the speculative request is canceled. In one embodiment, the coherent request is not speculatively issued unless the number of unresolved speculative requests is less than the total number of entries of the third table.

DETAILED DESCRIPTION OF THE INVENTION

In accordance with one embodiment of the present invention, a multi-core microprocessor includes, in part, a cache coherence manager that maintains coherence among the multitude of microprocessor cores, and further minimizes the latency associated with coherent read requests. The cache coherence manager includes, in part, a request unit, an intervention unit, a memory interface unit and a response unit. The cache coherence manager supports speculative reads and includes an indexing scheme that efficiently manages the processing of the speculative requests and the corresponding intervention messages forwarded to and received from the cores.

Figure 1:
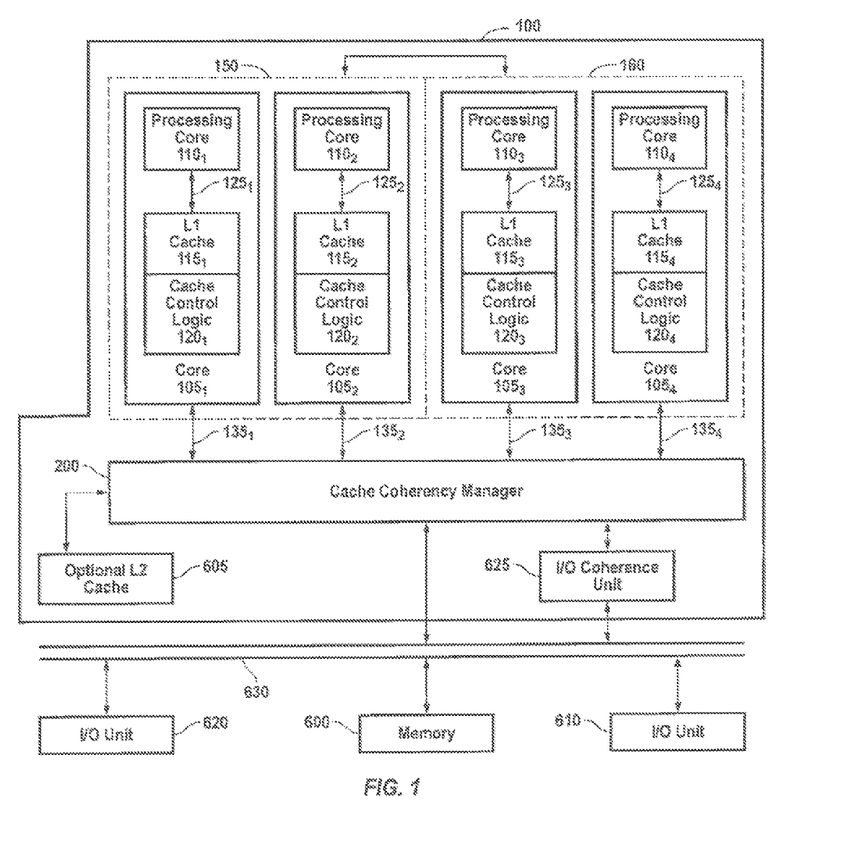
FIG. 1 shows a multi-core microprocessor, in communication with a number of input/output (I/O) devices and a system memory, in accordance with one embodiment of the present invention.

FIG. 1 is a block diagram of a microprocessor 100, in accordance with one exemplary embodiment of the present invention, that is in communication with system memory 600 and I/O units 610, 620 via system bus 630. Microprocessor (hereinafter alternatively referred to as processor) 100 is shown as including, in part, four cores $105_1$, $105_2$, $105_3$ and $105_4$, a cache coherency manger 200, and an optional level-2 (L2) cache 605. Each core $105_i$, where i is an integer ranging from 1 to N, where in this embodiment N=4, is shown as including, in part, a processing core $110_i$, an L1 cache $115_i$, and a cache control logic $120_i$. Although exemplary embodiment of processor 100 is shown as including four cores, it is understood that other embodiments of processor 100 may include more or fewer than four cores.

Each processing core $110_i$ is adapted to perform a multitude of fixed or flexible sequence of operations in response to program instructions. Each processing core $110_i$ may conform to either complex instruction set computing (CISC) and/or reduced instruction set computing (RISC) architectures to process scalar or vector data types using single instruction, single data (SISD) or single instruction, multiple data (SIMD) instructions. Each processing core $110_i$ may include general purpose and specialized register files and execution units configured to perform logic, arithmetic, and any other type of data processing functions. The processing cores $110_1$, $110_2$, $110_3$ and $110_4$, which are collectively referred to as either processing cores 110i or processing cores 110, may be configured to perform identical functions, or may alternatively be configured to perform different functions adapted to different applications. Processing cores 110 may be single-threaded or multi-threaded, i.e., capable of executing multiple sequences of program instructions in parallel.

Each core $105_i$ is shown as including a level-1 (L1) cache. In other embodiments, each core $110_i$ may include more levels of cache, e.g., level 2, level 3, etc. Each cache $115_i$ may include instructions and/or data. Each cache $115_i$ is typically organized to include a multitude of cache lines, with each line adapted to store a copy of the data corresponding with one or more virtual or physical memory addresses. Each cache line also stores additional information used to manage that cache line. Such additional information includes, for example, tag information used to identify the main memory address associated with the cache line, and cache coherency information used to synchronize the data in the cache line with other caches and/or with the main system memory. The cache tag may be formed from all or a portion of the memory address associated with the cache line.

Each L1 cache $115_i$ is coupled to its associated processing core $110_i$ via a bus $125_i$. Each bus $125_i$ includes a multitude of signal lines for carrying data and/or instructions. Each core $105_i$ is also shown as including a cache control logic $120_i$ to facilitate data transfer to and from its associated cache $115_i$. Each cache $115_i$ may be fully associative, set associative with two or more ways, or direct mapped. For clarity, each cache $115_i$ is shown as a single cache memory for storing data and instructions required by core $105_i$. Although not shown, it is understood that each core $105_i$ may include an L1 cache for storing data, and an L1 cache for storing instructions.

Each cache $115_i$ is partitioned into a number of cache lines, with each cache line corresponding to a range of adjacent locations in shared system memory 600. In one embodiment, each line of each cache, for example cache $115_i$, includes data to facilitate coherency between, e.g., cache $151_1$, main memory 600, and any other caches $115_2$, $115_3$, $115_4$, intended to remain coherent with cache $115_1$, as described further below. For example, in accordance with the MESI cache coherency protocol, each cache line is marked as being modified "M", exclusive "E", Shared "S", or Invalid "I", as is well known. Other cache coherency protocols, such as MSI, MOSI, and MOESI coherency protocols, are also supported by the embodiments of the present invention.

Each core $105_i$ is coupled to a cache coherency manager 200 via an associated bus $135_i$. Cache coherency manager 200 facilitates transfer of instructions and/or data between cores $105_i$, system memory 600, I/O units 610, 620 and optional shared L2 cache 605. Cache coherency manager 200 establishes the global ordering of requests, sends intervention requests, collects the responses to such requests, and sends the requested data back to the requesting core. Cache coherency manager 200 orders the requests so as to optimize memory accesses, load balance the requests, give priority to one or more cores over the other cores, and/or give priority to one or more types of requests over other requests. Although not shown, in some embodiments, one or more of cores $105_i$ include a dedicated Level-2 (L2) cache when optional shared L2 cache 605 is not used.

Figure 2:
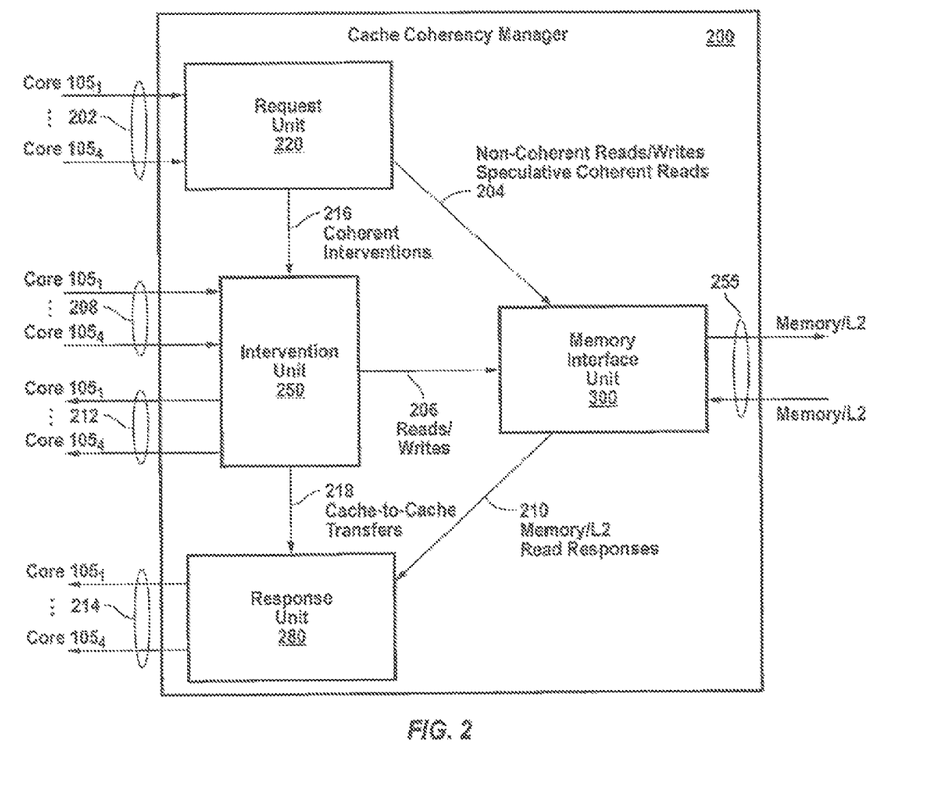
FIG. 2 is a block diagram of the cache coherence manger disposed in the microprocessor of FIG. 1, in accordance with one embodiment of the present invention.

FIG. 2 is a block diagram of cache coherency manager 200, in accordance with one embodiment of the present invention. Cache coherency manager 200 is shown as including, in part, a request unit (RQU) 220, an intervention unit (IVU) 250, a response unit (RSU) 280, and a memory interface unit (MIU) 300. Request unit 220 includes input ports 202 adapted to receive, for example, read requests, write requests, writeback requests and any other cache memory related requests from cores $105_i$. Request unit 220 serializes the requests it receives from cores $105_i$ and sends non-coherent read/write requests, speculative coherent read requests, as well as explicit and implicit writeback requests of modified cache data to memory interface unit 300 via port 204. Request unit 220 sends coherent requests to intervention unit 250 via port 216. In order to avoid a read after write hazard, the read address is compared against pending coherent requests that can generate write operations. If a match is detected as a result of this comparison, the read request is not started speculatively.

In response to the coherent intervention requests received from request unit 220, intervention unit 250 issues an intervention message via output ports 212. A hit will cause the data to return to the intervention unit via input ports 208. In another embodiment, the requested data is returned to the intervention unit 250. Intervention unit 250 subsequently forwards this data to response unit 280 via output ports 218. Response unit 280 forwards this data to the requesting (originating the request) core via output ports 214. If there is a cache miss and the read request was not performed speculatively, intervention unit 250 requests access to this data by sending a coherent read or write request to memory interface unit 300 via output ports 206. A read request may proceed without speculation when, for example, a request memory buffer disposed in request unit 220 and adapted to store and transfer the requests to memory interface unit 300 is full.

Memory interface unit 300 receives non-coherent read/write requests from request unit 220, as well as speculative requests and writeback requests from intervention unit 250. In response, memory interface unit 300 accesses system memory 600 and/or higher level cache memories such as L2 cache 605 via input/output ports 255 to complete these requests. The data retrieved from memory 600 and/or higher level cache memories in response to such memory requests is forwarded to response unit 280 via output port 210. The response unit 280 returns the data requested by the requesting core via output ports 214. As is understood, the requested data may have been retrieved from an L1 cache of another core, from memory 600, or from optional higher level cache memories.

Figure 3:
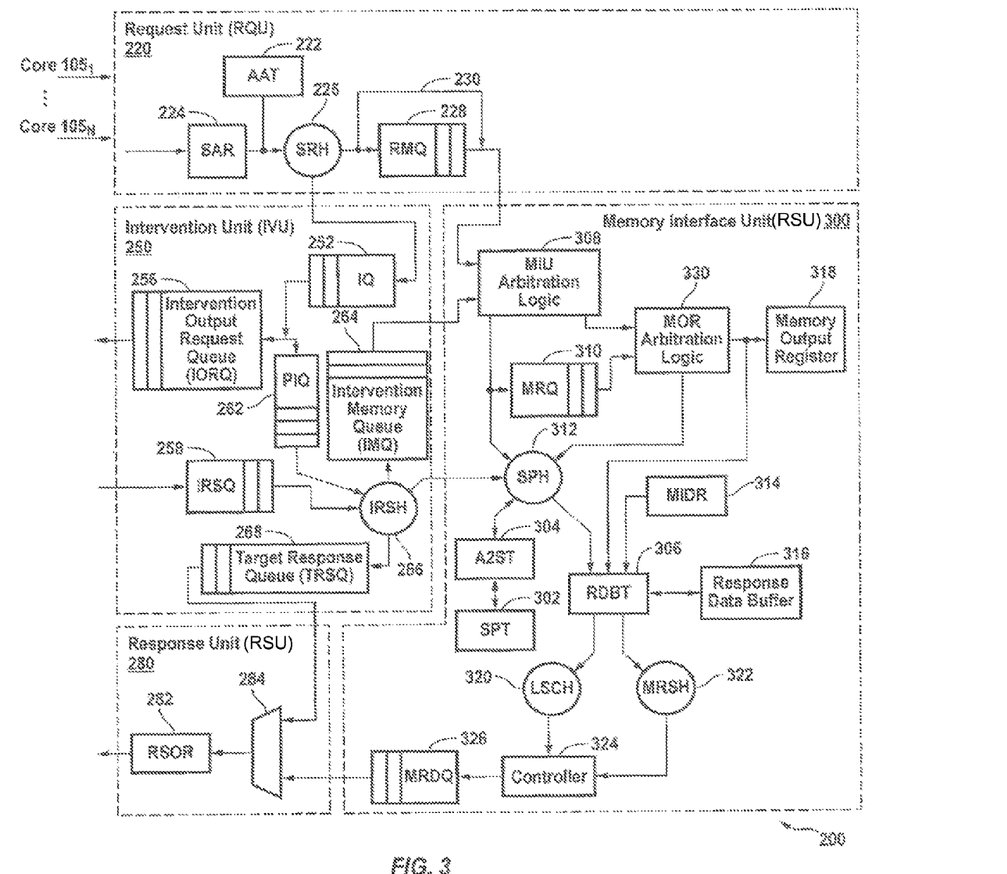
FIG. 3 is a more detailed block diagram of the cache coherence manager of FIG. 2, in accordance with one embodiment of the present invention.

FIG. 3 is a more detailed view of cache coherence manager 200 disposed in a microprocessor having N cores, in accordance with one embodiment of the present invention. Referring to FIGS. 1 and 3 concurrently, in order to reduce average latency of a coherent read request from any of the N cores $105_i$, where i is an integer varying from 1 to N, coherence manager 200 issues speculative read requests to memory 600 via memory interface unit 300. The speculative read assumes that the requested data will not be found in any of the cores. If the requested data is found in response to the intervention message, the speculative read is canceled if it has not yet been issued by memory interface unit 300, or alternatively the response is dropped when it returns from system memory 600.

The response to an intervention message may arrive at the intervention unit 250 at different points in time relative to the speculative request. The request may still be in the request unit 220 when the response to the associated intervention message is received by the intervention unit 250. The request may be in the memory interface unit 300 when the response to the associated intervention message is received by intervention unit 250. The request may have been issued to the memory by the time the response to the associated intervention message arrives at the intervention unit 250. A number of data segments associated with the speculative read request may have been received by the memory interface unit 300 before the response to the associated intervention message is received by the intervention unit 250. Coherence manager 200 is configured to handle speculative requests for all possible timing conditions described above, notwithstanding the outcome of the intervention message, i.e., cancel or confirm.

Incoming coherent requests are serialized by serialized address register (SAR) 224 disposed in request unit 220. In one embodiment, the cache line address associated with each request is compared to the entries stored in the active address table (AAT) 222. An address match indicates that a coherent request is already pending for that address and hence no speculative request is issued for that request. If no address match is detected and a slot is available in request memory queue (RMQ) 228, serialized request handler (SRH) 226 loads the request in RMQ 228. If a slot is not available in RMQ 228, no speculative request is issued for that request even if no speculation is detected as being in progress for that address. Furthermore, if RQU 220 receives a coherent request that was erroneously issued due, for example, to software error, then RQU 220 will not issue a corresponding speculative request. Similarly, if RQU 220 issues a speculative request that bypasses the RMQ 228—via signal line 230—and subsequently detects an error with this request, RQU 220 will cancel this request. AAT 222 performs two functions. First, it keeps track of active coherent requests to inhibit read-after-write hazards. An intervention response to a coherent request may result in a read or write operation to the memory. AAT 222 is used to ensure that a speculative read to the same address does not occur before the updated data is written to the memory, thereby to avoid read-after-write hazards. Second, AAT 222 is used to tag the speculative requests to enable their identification as they flow between the IVU 250, RQU 220 and MIU 300.

The AAT number associated with a speculative request travels with that request to MIU 300. Accordingly, RMQ 228 stores both the speculative request as well as the AAT number associated with that request. In another embodiment, SAR 224 issues the speculative request before it looks-up the address in AAT 222. One clock cycle later, if the look-up in AAT 222 indicates that an earlier issued speculative request is still pending for that address, the newly issued speculative request is canceled. A speculative request issued before an AAT 222 look-up may get stored in memory request queue (MRQ) 310 or get issued to the memory. Under both conditions, the speculative request is canceled if the subsequent AAT 222 look-up results in an address match. The cancellation of such a request results in deallocation of any corresponding numbers that may have been assigned to that request in speculative table 302 and/or request data buffer table 306. The process of allocating and deallocating numbers in various tables disposed in memory interface unit 300 are described in detail below.

Coherent read requests are received from SRH 226 and stored in intervention queue (IQ) 252. Corresponding intervention messages are issued after these requests are stored in intervention output request queue 256. Intervention messages that have been forwarded to the cores are stored in pending intervention queue (PIQ) 262, and responses to these intervention messages are stored in intervention response queue (IRSQ) 258. The AAT number associated with a request is stored in PIQ 262.

Memory interface unit 300 includes, in part, a speculative table (SPT) 302, an active address to speculation table (A2ST) 304, and a read data buffer table (RDBT) 306. As described further below, SPT 302 tracks the confirm/cancel results for speculative requests that have been received by MIU 300. An entry (alternatively referred to herein as number) in SPT 302 is allocated when a speculative request is received by MIU 300 from RQU 220. The SPT entry is loaded into memory request queue (MRQ) 310 together with the request. Response data buffer table (RDBT) 306 tracks information associated with the requests that have been issued to the memory. An entry in RDBT 306 is allocated for every read request that is issued to the memory. The response to a read request is stored in the response data buffer (RDB) 316 at an address defined by the corresponding entry in RDBT 306. A2ST 304 performs two functions. First, for each AAT entry, A2ST 304 supplies the corresponding SPT entry. Second, A2ST temporarily stores the confirm/cancel result for any speculative request that has not been received by MIU 300 and for which an SPT entry has not yet been allocated. In such conditions, when the request is received by MIU 300, the confirm/cancel result is copied from A2ST 304 to the associated SPT entry newly allocated. When a request stored in RMQ 228 is delivered and stored in MRQ 310, the AAT number associated with that request is also stored in the newly allocated entry in SPT 302.

Confirm/cancel results returned in response to an intervention message and the AAT entry associated with the corresponding read request are delivered from Intervention Response Handler (IRSH) 266 to speculative handler (SPH) 312. The confirm/cancel results are received in the same order as they are transmitted. This ordering ensures that the AAT number supplied by PIQ 262 and the confirm/cancel result supplied by IRSQ 258 are associated with the same request as they are delivered to IRSH 266. The confirm/cancel result, and the associated AAT number are subsequently delivered from IRSH 266 to speculative handler (SPH) 312.

Memory output register (MOR) 318 and memory input data register (MIDR) 314 are the interfaces between MIU 300 and memory 600. Outgoing requests are sent to memory 600 via MOR 318, and data received form memory 600 is loaded in MDIR 314. An entry is allocated for a request in RDBT 306 before that request is issued to memory 600. The data loaded in MDIR 314 is stored in RDB 316 at an address defined by the entry allocated in RDBT 306.

The response to an intervention message may arrive at IVU 250 before the corresponding speculative request has been issued to MIU 300. This condition may happen, for example, when MRQ 310 is full and cannot receive the speculative request at the time when the response to the corresponding intervention message arrives at IVU 250. To handle such conditions, the AAT entry and the intervention response, i.e., confirm/cancel result, associated with that request is delivered to SPH 312 by IRSH 266. The confirm/cancel result is subsequently stored in A2ST 304. After the speculative request is stored in MRQ 310, a corresponding entry in SPT 302 is allocated and the intervention response, i.e., confirm/cancel result is copied from A2ST 304 to that entry in SPT 302. If the intervention response is a speculative confirm, SPH 312 allocates an entry in RDBT 306 and deallocates the corresponding SPT entry. Subsequently, a read request is issued to the memory. If the intervention response is a speculative cancel, the speculative request is canceled and the corresponding SPT entry is deallocated.

The response to an intervention message may arrive at IVU 250 after the corresponding speculative request has been received by MIU 300. Since the request is already stored in MRQ 310, it has an assigned entry in SPT 302. When the request reaches the head of the queue in MRQ 310, the SPT entry associated with that request is looked-up. If the received intervention response is a speculative confirm, (i) an entry in RDBT 306 is allocated and its confirmed bit is set, (ii) the corresponding SPT entry is deallocated, and (iii) a read request is issued to the memory. If the received intervention is a speculative cancel, the speculative request is canceled and the corresponding SPT entry is deallocated. If no intervention response is received after the request reaches the head of the queue in MRQ 310, the speculative request is issued to the memory.

MIU arbitration logic 308 arbitrates access to MRQ 310 between IVU 250 and RQU 220. When no speculative request is made because RMQ 228 is full and it is subsequently determined that the none of the caches contain the requested data, a corresponding request is made to the memory by IVU 250. This request is received by MIU arbitration logic 308 and delivered to MRQ 310. This request is thereafter delivered to MOR 318—via MOR arbitration logic 330—for later submission to the memory. MRQ 310 is bypassed if it is empty, in turn, causing MIU arbitration logic 308 to transfer the request directly to MOR arbitration logic 308. SPH 312 transfers confirm/cancel results from SPT 302 to RDBT 306. MOR arbitration logic 308 gains access to SPT 302 and RDBT 306 via SPH 312.

The response to an intervention message may arrive at IVU 250 after the corresponding speculative request has been issued to the memory but before the requested data has been received from the memory. The RDBT's corresponding confirmed and canceled bits are both cleared if the intervention response is not known at the time the speculative request is issued to the memory. When the intervention response is received by SPH 312, A2ST 304 uses the AAT supplied by PIQ 262 to find the corresponding SPT entry. The SPT entry is then used to supply the corresponding RDBT entry. The RDBT entry is then updated with the confirm/cancel result of the intervention response. The corresponding entry in SPT 320 is then deallocated. Each speculative read request that is sent to the memory is allocated a corresponding entry in RDBT 306. The data supplied by the memory in response to the read request is received by MIDR 314 and is subsequently stored in RDB 316 at an address defined by the corresponding entry in RDBT 306. Memory response handler (MRSH) 322 looks-up the status of the corresponding RDBT entry when the data is returned and stored in RDB 306. If the speculative request has been confirmed, the data is delivered to controller 324, which in turn, stores this data in memory read data queue (MRDQ) 326. If the speculative request has been canceled, the RDB/RDBT entries are deallocated after all the segments of the requested data are received from the memory. Controller 324 may include a number of queues to accommodate the transfer of the data to MRDQ 326. Data stored in MRDQ 326 is subsequently transferred to response output register (RSOR) 282. RSOR 282 subsequently supplies this data to the requesting core. MRSH 322 is triggered to perform the look-up operation in RDBT 306 when the associated data is stored in RDB 316.

The response to an intervention message may arrive at IVU 250 after part or the entire data corresponding to the speculative request has been received from the memory. If the intervention response is not known by the time a segment, such as a double-word, of the requested data is received, the transaction is considered as a late completion. Late completions are handled by the late speculation completion handler (LCSH) 320. If a late completion is marked so as to cancel the speculative request, LCSH 320 retires the RDBT/RDB entry after the entire segments of the requested data are received from the memory. If a late completion is marked so as to confirm the speculative request, LCSH 320 waits for the entire segments of the requested data to arrive. The received data are thereafter delivered to controller 324, which in turn, stores this data in MRDQ 326. The data present in MRDQ 326 is supplied to the requesting core after being stored in RSOR 282. LSCH 320 is triggered when it receives the late intervention response. An AAT entry may be deallocated if the coherent request does not result in a required memory operation, such as a memory write-back operation to the memory, only if both the intervention response and the corresponding speculative request are received by MIU 300. If a coherent request results in a required memory access operation, the AAT entry is not deallocated until after the intervention response, the corresponding speculative request, and any required memory access operation resulting from the intervention are all received by MIU 300. This ensures that, for example, when a write-back to the memory is required, the memory write operation is in the MIU 300 ahead of the speculative request before the AAT entry is deallocated 720.

Figure 4A:
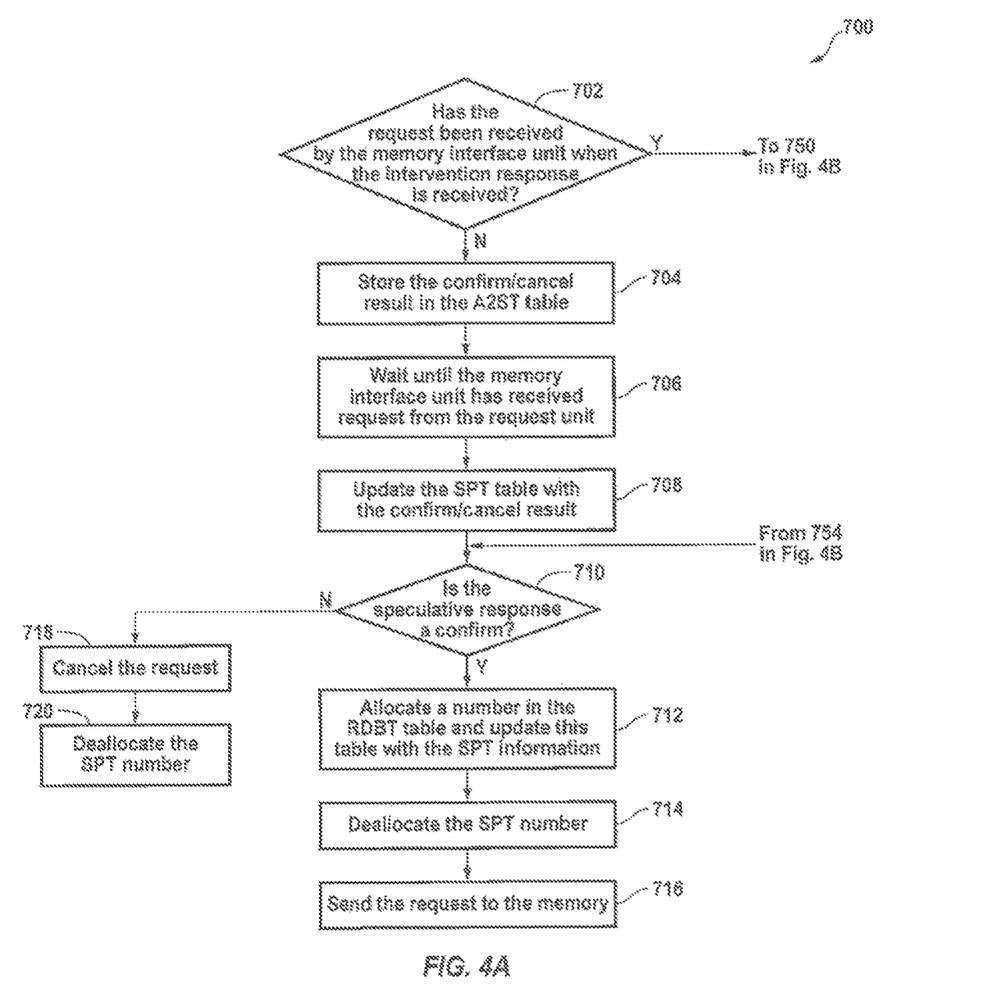
FIGS. 4A, 4B and 4C form a flowchart showing a speculative request, in accordance with one embodiment of the present invention.
Figure 4B:
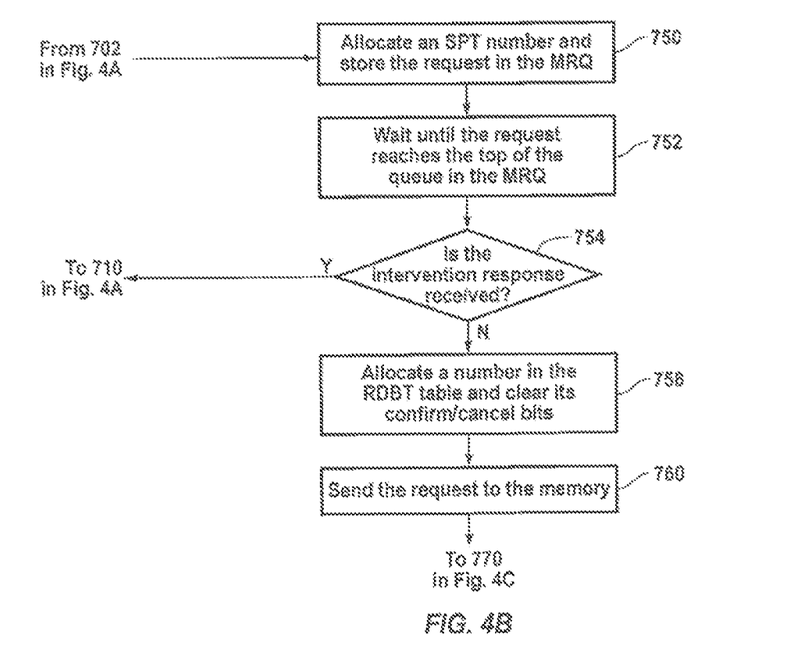
Figure 4C:
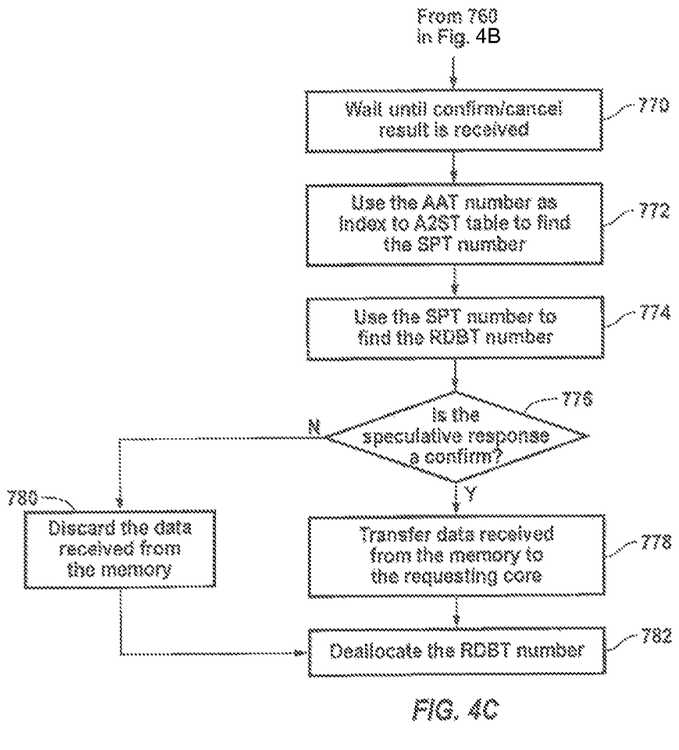

FIGS. 4A, 4B and 4C are a flowchart 700 of steps carried out to perform a speculative request, in accordance with one embodiment of the present invention. Referring to FIG. 4A, if the request is determined to be in the request unit when the response to the intervention message is received 702, the confirm/cancel result is stored 704 in the A2ST. After the request is stored 706 in the MRQ, the SPT is updated with the confirm/cancel result 708. If the speculative response is a confirm 710, an RDBT number is allocated and used as an index to the RDBT to store the confirm result 712. The SPT number is deallocated 714 and the request is thereafter sent to the memory. If the speculative response is a cancel 710, the request is canceled 718 and the SPT number is deallocated.

Referring to FIG. 4B, a request stored in the MRQ has an allocated SPT number 750. If an intervention response is available 754 after the request reaches the top of the queue in the MRQ 752, the process moves to decision block 710 (FIG. 4A). If the intervention response is not available 754 after the request reaches 752 the top of the queue in the MRQ, an RDBT number is allocated to the request 758, and its confirm/cancel bits are cleared. The request is thereafter sent to the memory 760.

Referring to FIG. 4C, after the confirm/cancel result is received 770, the AAT number is used as an index to the A2ST to find the SPT number 772. The SPT number is then used to find the RDBT number 774. If the speculative response is a confirm 776, the data received from the memory is transferred to the requesting core 778, and the RDBT number is deallocated 782. If the speculative response is a cancel 776, the data received from the memory is discarded 780 and the RDBT number is deallocated 782.

Figure 5:
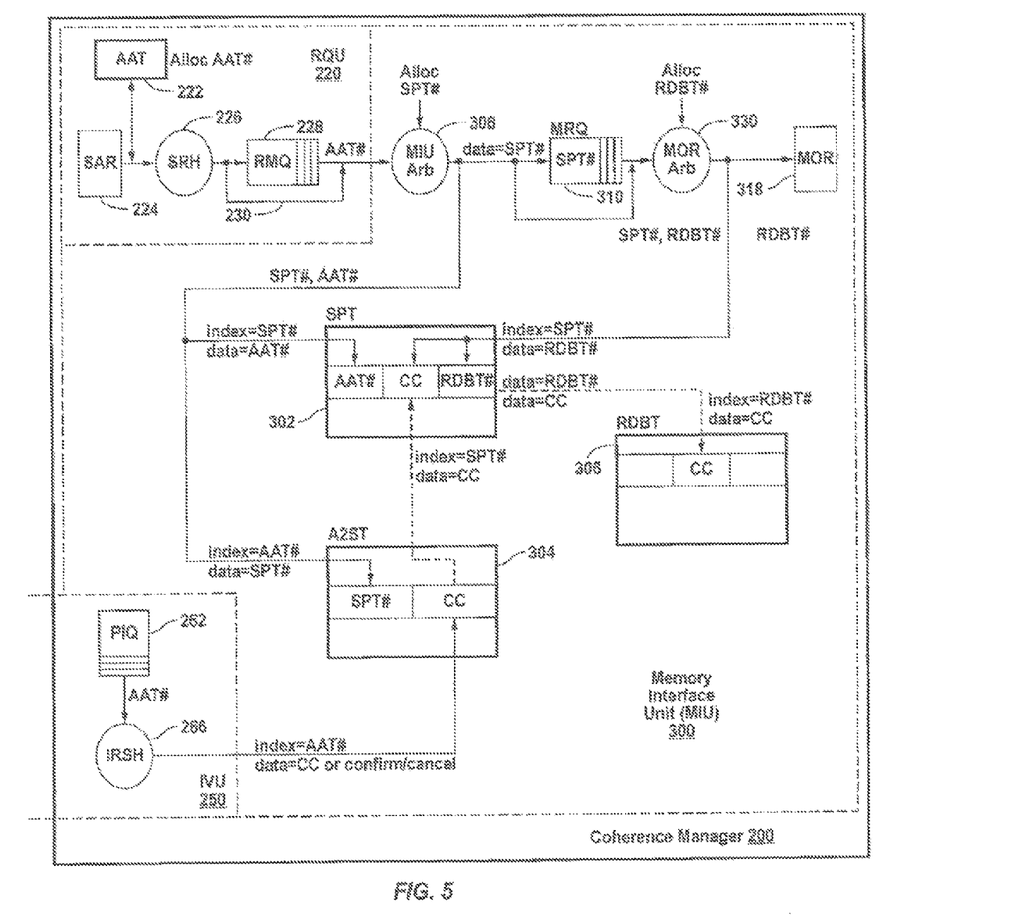
FIG. 5 shows the flow of indices and data between a number of tables disposed in the cache coherence manager of in FIG. 3.

FIG. 5 shows the flow of indices and entries associated with a request between AAT 222, SPT 302, A2ST 304, and RDBT 306 of coherence manager 200. For clarity, only a few of the blocks disposed in coherence manager 200 are shown in FIG. 5. The AAT number, allocated to each coherent request and used to track the associated speculative request as described above, is delivered to MIU 300 and IVU 250. An SPT number is allocated by MIU arbitration logic 308 when a slot become available in MRQ 310 for that request; MRQ 310 stores the SPT number. An RDBT number is allocated by MOR arbitration logic 330 when the request is issued to the memory via MOR 318. The SPT number is used as an index to store the AAT number in SPT 302, and the AAT number is used as an index to store the SPT number in A2ST 304.

When the response to an intervention message arrives at IVU 250 while the speculative read request is still in RMQ 228, the confirm/cancel (CC) result is first stored in A2ST table 304. The SPT number allocated after the request is stored in MRQ 310, is used as an index to store the AAT number in SPT 302. The AAT number stored in PIQ 262 is used as an index to A2ST 304 to look-up the CC. The retrieved CC is copied to SPT 302 at the index defined by the SPT number. If the CC is a speculative confirm, an RDBT 306 number is allocated. The SPT number is then used as an index to SPT 302 to retrieve and copy the CC result to RDBT 306. If the intervention response is a speculative cancel, the speculative request is canceled and the corresponding SPT entry is deallocated. An SPT number exists if the request is already stored in MRQ 310. The allocated SPT number is used as an index to SPT 302 to store the AAT number. When the CC is received, the AAT number stored in PIQ 262 is used as an index to A2ST 304 to look-up the SPT number. The SPT number is then used as an index to SPT 302 to store the CC. When the request reaches the head of the queue in MRQ 310, the SPT number is interrogated. If the CC is a speculative confirm, a corresponding number in RDBT 306 is allocated. The RDBT number is used as an index to RDBT 306 to store the CC. The corresponding SPT number is deallocated, and a read request is issued to the memory. If the received intervention is a speculative cancel, the speculative request is canceled and the corresponding SPT entry is deallocated.

The response to an intervention message may arrive at IVU 250 after the corresponding speculative request has been issued to the memory but before the response to the request has been received from the memory. In such conditions, the AAT and RDBT numbers are stored in the SPT 302 at the index defined by the SPT number. The SPT number is stored in A2ST 304 at an index defined by the SPT number. The AAT number corresponding to the received CC is used to identify the corresponding SPT number in A2ST table 304. The SPT number so identified is then used to find the corresponding RDBT number. The RDBT number is subsequently used as an index to RDBT 306 to store the CC result; the corresponding SPT number is then deallocated. If the CC is a confirm, the data supplied by the memory is delivered to RSU 280. If the CC is a cancel, the RDB/RDBT entries are deallocated after all the segments of the requested data are received from the memory.

The response to an intervention message may arrive at IVU 250 after part or the entire data corresponding to the speculative request has been received from the memory. In such conditions, the AAT and RDBT numbers are stored in the SPT 302 at the index defined by the SPT number. The SPT number is stored in A2ST 304 at an index defined by the SPT number. The AAT number corresponding to the received CC is used to identify the corresponding SPT number in A2ST table 304. The SPT number so identified is then used to find the corresponding RDBT number. The RDBT number is subsequently used as an index to RDBT 306 to store the CC result. If the CC is a confirm, the data supplied by the memory is delivered to RSU 280 by LSCH 320. If the CC is a cancel, the RDB/RDBT entries are deallocated after all the segments of the requested data are received from the memory.

As described above, in accordance with one embodiment of the present invention, the queues, tables and the ports in coherence manager 200 are configurable to support different sizes and optimize power consumption and performance. A deadlock condition may thus occur when the sum of the sizes of IQ 252 and PIQ 262 is greater than the sum of the sizes of RDBT 306 and MRQ 310. To prevent this condition from occurring, in accordance with one embodiment of the present invention, SAR 224 is adapted so as not issue any speculative requests unless the number of unresolved speculative requests, i.e., speculative requests for which the associated intervention responses have not yet been completed, is less than the total number of entries in RDBT 306. For example, if RDBT 306 has a capacity to hold 16 entries, no more than 15 unresolved speculative requests may be pending at any given time.

Figure 6:
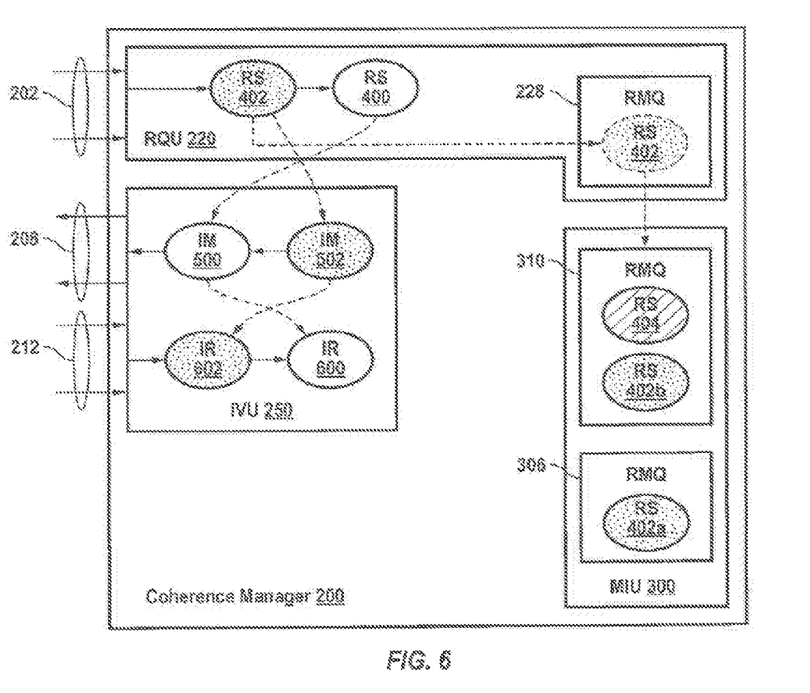
FIG. 6 shows the flow of speculative and non-speculative requests that may lead to a deadlock condition and which the present invention is adapted to inhibit.

Referring to FIGS. 3 and 6 concurrently, assume that a first stream of requests 400 followed by a second stream of requests 402 are delivered to request unit 220. Assume that RMQ 228 is full when the first stream of requests (RS) 400 is received; therefore these requests are not stored in RMQ 228 and are not speculated. Assume that RMQ 228 is empty when RS 402 is received; therefore these requests are stored in RMQ 228 and are speculated. Intervention messages (IM) 500 and 502, corresponding respectively to request streams 400 and 402, are forwarded to IVU 250. Intervention responses (IR) 600 and 602 are assumed to be respectively associated with IMs 500 and 502.

RS 402 is subsequently transferred to and stored in MRQ 310. Assume that a first portion 402a of RS 402 is issued to the memory and their associated entries allocated in RDBT 306 fill all the slots in RDBT 306. Assume that MRQ 310 is filled with the remaining portion 402b of RS 402, as well as with non-coherent stream of request 404 that subsequently arrive.

Assume that one or more of the responses in IR 600 contain cache misses. Because no speculative requests were issued for the associated RS 400, these requests must be supplied to the memory and thus must first be written in MRQ 310. However, MRQ 310 is full and cannot accept any new requests unless there is an entry available in RDBT 306. The entries in RDBT 306 cannot be cleared since the confirm/cancel results needed to clear these requests are present in IR 602, which is stuck behind IR 600. Accordingly, a deadlock is created where no entry can be cleared and no movement of requests can flow through the coherence manager 200. To prevent such deadlocks, in accordance with one embodiment of the present invention, SAR 224 is adapted so as not issue any speculative requests unless the number of unresolved speculative requests is at least one less than the total number of entries in RDBT 306.

In accordance with one embodiment of the present invention, the cache coherence manager includes, in part, a multitude of configurable ports, a multitude of configurable tables, and a multitude of configurable queues. The configurability of the ports enables a user to select the number of desired ports. For example, assume that the coherence manager has 16 configurable ports. A user may, however, need only four such ports to adapt the coherence manager to a microprocessor having four cores. The user accordingly configures the coherence manager so as to use only four of the 16 ports. The configurability of the tables and queues enable a user to define their respective sizes to balance the competing goals of achieving optimum processor performance and minimizing the die size.

Figure 7:
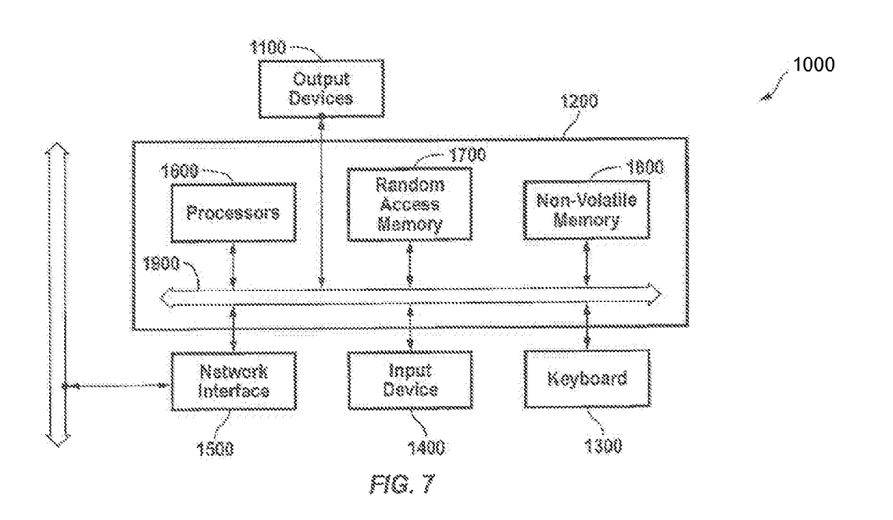
FIG. 7 shows an exemplary computer system in which the present invention may be embodied.

FIG. 7 illustrates an exemplary computer system 1000 in which the present invention may be embodied. Computer system 1000 typically includes one or more output devices 1100, including display devices such as a cathode ray tube (CRT), liquid crystal display (LCD), organic light-emitting diode (OLED), light-emitting diode (LED), gas plasma, electronic ink, or other types of displays, speakers and other audio output devices; and haptic output devices such as vibrating actuators; computer 1200; a keyboard 1300; input devices 1400; and a network interface 1500. Input devices 1400 may include a computer mouse, a trackball, joystick, track pad, graphics tablet, touch screen, microphone, various sensors, and/or other wired or wireless input devices that allow a user or the environment to interact with computer system 1000. Network interface 1500 typically provides wired or wireless communication with an electronic communications network, such as a local area network, a wide area network, for example the Internet, and/or virtual networks, for example a virtual private network (VPN). Network interface 1500 can implement one or more wired or wireless networking technologies, including Ethernet, one or more of the 802.11 standards, Bluetooth, and ultra-wideband networking technologies.

Computer 1200 typically includes components such as one or more general purpose processors 1600, and memory storage devices, such as a random access memory (RAM) 1700 and non-volatile memory 1800. Non-volatile memory 1800 can include floppy disks; fixed or removable hard disks; optical storage media such as DVD-ROM, CD-ROM, and bar codes; non-volatile semiconductor memory devices such as flash memories; read-only-memories (ROMS); battery-backed volatile memories; paper or other printing mediums; and networked storage devices. System bus 1900 interconnects the above components. Processors 1600 may be a multi-processor system such as microprocessor 100 described above.

RAM 1700 and non-volatile memory 1800 are examples of tangible media for storage of data, audio/video files, computer programs, applet interpreters or compilers, virtual machines, and embodiments of the present invention described above. For example, the above described embodiments of the processors of the present invention may be represented as human-readable or computer-usable programs and data files that enable the design, description, modeling, simulation, testing, integration, and/or fabrication of integrated circuits and/or computer systems. Such programs and data files may be used to implement embodiments of the invention as separate integrated circuits or used to integrate embodiments of the invention with other components to form combined integrated circuits, such as microprocessors, microcontrollers, system on a chip (SoC), digital signal processors, embedded processors, or application specific integrated circuits (ASICs).

Programs and data files expressing embodiments of the present invention may use general-purpose programming or scripting languages, such as C or C++; hardware description languages, such as VHDL or Verilog; microcode implemented in RAM, ROM, or hard-wired and adapted to control and coordinate the operation of components within a processor or other integrated circuit; and/or standard or proprietary format data files suitable for use with electronic design automation software applications known in the art. Programs and data files can express embodiments of the invention at various levels of abstraction, including as a functional description, as a synthesized netlist of logic gates and other circuit components, and as an integrated circuit layout or set of masks suitable for use with semiconductor fabrication processes. These programs and data files can be processed by electronic design automation software executed by a computer to design a processor and generate masks for its fabrication.

Further embodiments of computer 1200 can include specialized input, output, and communications subsystems for configuring, operating, simulating, testing, and communicating with specialized hardware and software used in the design, testing, and fabrication of integrated circuits.

Although some exemplary embodiments of the present invention are made with reference to a processor having four cores, it is understood that the processor may have more or fewer than four cores. The arrangement and the number of the various devices shown in the block diagrams are for clarity and ease of understanding. It is understood that combinations of blocks, additions of new blocks, re-arrangement of blocks, and the like fall within alternative embodiments of the present invention. For example, any number of I/Os, coherent multi-core processors, system memories, L2 and L3 caches, and non-coherent cached or cacheless processing cores may also be used.

It is understood that the apparatus and methods described herein may be included in a semiconductor intellectual property core, such as a microprocessor core (e.g. expressed as a hardware description language description or a synthesized netlist) and transformed to hardware in the production of integrated circuits. Additionally, the embodiments of the present invention may be implemented using combinations of hardware and software, including micro-code suitable for execution within a processor.

The above embodiments of the present invention are illustrative and not limitative. Various alternatives and equivalents are possible. The invention is not limited by the type of integrated circuit in which the present disclosure may be disposed. Nor is the invention limited to any specific type of process technology, e.g., complementary metal-oxide-semiconductor (CMOS, Bipolar, bipolar CMOS (BICMOS), or otherwise, that may be used to manufacture the various embodiments of the present invention. Other additions, subtractions or modifications are obvious in view of the present invention and are intended to fall within the scope of the appended claims.

The invention claimed is:

1. A microprocessor comprising:
a plurality of processing cores; and
a cache coherence manager adapted to maintain coherence between the plurality of processing cores and minimize latency in performing coherent requests, said cache coherence manager comprising:
   a request unit configured to receive a coherent request from a first one of the plurality of cores and to selectively issue a speculative request in response;
   an intervention unit configured to send an intervention message associated with the coherent request to the plurality of cores;
   a memory interface unit configured to receive the speculative request and to selectively forward the speculative request to a memory, wherein the memory interface unit comprises a first table, a second table, and a third table, wherein an entry in said first table represents an index to said second table and wherein an entry in said second table represents an index to said third table, and wherein an index to said first table is allocated before a response to the intervention message is stored in the first table and before the speculative request is received by the memory interface unit; and
   a response unit configured to supply data associated with the coherent request to the first one of the plurality of cores.

2. The microprocessor of claim 1, wherein an index to said second table is allocated when the speculative request is stored in the memory interface unit.

3. The microprocessor of claim 1, wherein an index to said third table is allocated when the speculative request is issued to the memory.

4. The microprocessor of claim 1, wherein said request unit comprises:
   a fourth table storing a plurality of entries each associated with a different one of a plurality of pending coherent requests; and
   a logic block configured to compare an address associated with the received coherent request to the plurality of addresses stored in the fourth table to determine if there is an address match, said logic block configured to issue the speculative request if an address match is not detected, said request unit further configured to assign an identifier to the received coherent request, said identifier representing the index to the first entry in the first table.

5. The microprocessor of claim 1, wherein said request unit comprises:
   a fourth table storing a plurality of entries each associated with a different one of a plurality of pending coherent requests; and
   a logic block configured to issue the speculative request and to subsequently compare an address associated with the received coherent request to the plurality of addresses stored in the fourth table to determine if there is an address match, said logic block configured to cancel the speculative request if an address match is detected, said request unit further configured to assign an identifier to the received coherent request, said identifier representing the index to the first entry in the first table.

6. The microprocessor of claim 1, wherein said request unit is configured not to issue the speculative request unless a number of pending speculative requests not having intervention responses is less than a number of possible entries in the third table.

7. A microprocessor comprising:
a plurality of processing cores; and
a cache coherence manager adapted to maintain coherence between the plurality of processing cores and minimize latency in performing coherent requests, to selectively issue a speculative request to a memory, and to issue an intervention message to the plurality of cores in response to a coherent request, said cache coherence manager comprising:
   a plurality of configurable ports;
   a plurality of configurable tables; and
   a plurality of configurable queues;
wherein a first one of the plurality of configurable tables stores a response to the intervention message using an index defined by an identifier allocated to the coherent request if the selectively issued speculative request is in a first one of the plurality of configurable queues when the response to the intervention message is received,
and wherein an entry is allocated to the coherent request in a second one of the plurality of configurable tables when the selectively issued speculative request is delivered from the first one of the plurality of configurable queues to a second one of the plurality of configurable queues, wherein after the allocation of the entry in the second one of the plurality of configurable tables, the response to the intervention message is transferred to the second one of the plurality of configurable tables from the first one of the plurality of configurable tables.

8. A method of operating a microprocessor, said microprocessor comprising a plurality of processing cores and a cache coherence manager configured to maintain coherence between the plurality of processing cores and minimize latency in performing coherent requests, the method comprising:
   receiving a coherent request from a first one of the plurality of cores;
   selectively issuing a speculative request in response to the received coherent request;
   sending an intervention message associated with the coherent request to the plurality of cores;
   selectively forwarding the speculative request to a memory;
   defining an entry in a first table for use as an index to said second table;
   defining an entry in a second table for use as an index to a third table, said first, second and third tables being disposed in the cache coherence manager; and
   allocating an index to said first table before a response to the intervention message is stored in the first table and before the speculative request is stored in a first queue.

9. The method of claim 8, further comprising:
   allocating an index to said second table when the speculative request is stored in a second queue.

10. The method of claim 9, further comprising:
    allocating an index to said third table when the speculative request is issued to the memory.

11. The method of claim 10, further comprising:

comparing an address associated with the coherent request to a plurality of stored addresses to detect if there is an address match, each stored address being associated with a different one of a plurality of pending coherent requests;

issuing the speculative request if an address match is not detected;

assigning an identifier to the issued speculative request; and using said identifier as an index to the first entry stored in the first table.

12. The method of claim 10, further comprising:

issuing the speculative request;

comparing an address associated with the issued speculative request to a plurality of stored addresses to detect if there is an address match, each stored address being associated with a different one of a plurality of pending coherent requests;

canceling the speculative request if an address match is detected;

assigning an identifier to the issued speculative request; and using said identifier as an index to the first entry stored in the first table.

13. The method of claim 10 further comprising:

issuing the speculative request only if a number of pending speculative requests not having intervention responses is less than a number of possible entries in the third table.

* * * * *